United States Patent [19]

Smith

[11] 4,329,107

[45] May 11, 1982

[54] WIRE ROPE SPARE TIRE CARRIER

[76] Inventor: Lindel F. Smith, Rte. 4, Box 410, Seminole, Okla. 74868

[21] Appl. No.: 114,065

[22] Filed: Jan. 21, 1980

[51] Int. Cl.³ ............................................. B62D 43/04
[52] U.S. Cl. ................................ 414/463; 224/42.06; 224/42.23; 254/264
[58] Field of Search .............................. 414/463–466; 224/42.06, 42.21, 42.23, 42.24; 410/10–12, 23, 33–37, 100, 103; 254/127, 243, 251, 256, 264, 209; 105/304, 306, 302, 292

[56] References Cited

U.S. PATENT DOCUMENTS

| 3,390,864 | 7/1968 | Searcy et al. | 414/463 X |
| 3,395,819 | 8/1968 | Fruetel | 414/463 |
| 3,542,413 | 11/1970 | Hardison | 414/463 X |
| 3,554,397 | 1/1971 | Cluff | 414/463 |
| 3,934,855 | 1/1976 | Patterson et al. | 254/264 X |

FOREIGN PATENT DOCUMENTS

| 207575 | 4/1957 | Australia | 414/463 |
| 2252776 | 6/1975 | France | 254/243 |

Primary Examiner—Leslie J. Paperner
Attorney, Agent, or Firm—James H. Chafin

[57] ABSTRACT

A vehicle undercarriage spare tire carrier having a first pulley located adjacent the storage position of the tire, and a second pulley located exterior of the vehicle. A lever arm is pivotally secured to the vehicle and has a cable attached thereto. The cable extends around the pulleys and terminates under the vehicle with a bracket for holding the spare tire.

The lever may be pivoted in a first direction for lowering and releasing the spare tire or pivoted in the opposite direction wherein the spare tire is pulled into tight engagement with the vehicle in its storage position. The relative positions of the pivot attachment points and pulleys are such that when the tire is in its storage position, the lever arm is in a safety position to prevent inadvertent release of the spare tire. The bracket for holding the spare tire provides a positive lock to insure against inadvertent loss of the tire when it is in its storage position.

5 Claims, 7 Drawing Figures

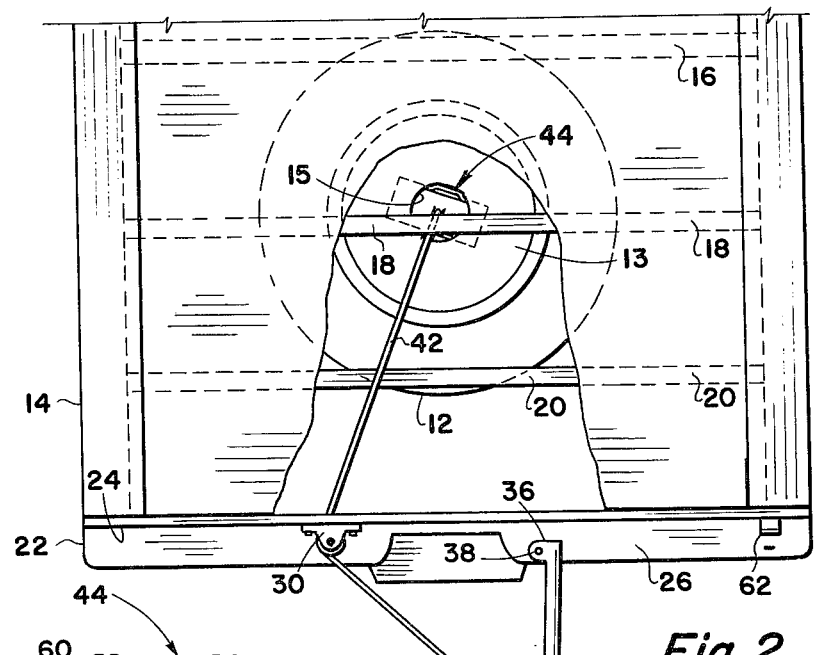
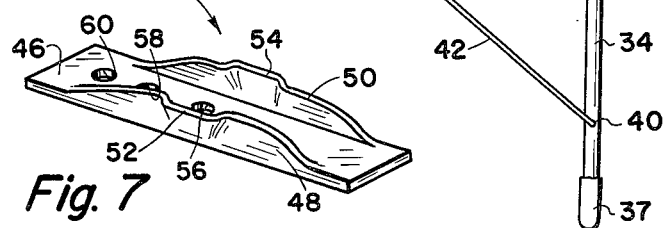
Fig. 2
Fig. 7
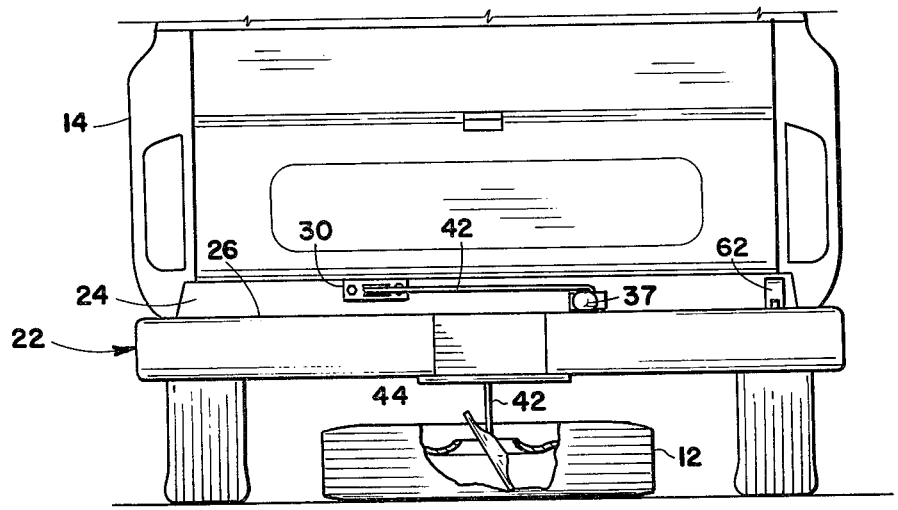
Fig. 3

WIRE ROPE SPARE TIRE CARRIER

BACKGROUND OF THE INVENTION

1. Field of the Invention

The present invention relates to a vehicle spare tire carrier and more particularly, but not by way of limitation, to a wire rope spare tire carrier, which is operated by a pivotal lever arm remote from the storage position of the tire.

2. History of the Prior Art

The present method for the attachment of a spare tire beneath the bed of a pickup truck is by way of an elongated bracket plate which is usually pivotal at one end and is connectable at the other end by way of a threaded stud and bolt.

In order to remove the spare tire from the typical vehicle, one must crawl beneath the bed of the pickup truck and unscrew the bracket nut while providing an upward pressure on the tire to hold it in position. One end of the bracket may then be lowered along with the tire. The tire is then slid out from under the truck for change or repair purposes.

The re-mounting of the tire is particularly cumbersome and requires a considerable amount of strength since the tire must be fitted back against the bracket and then the tire and bracket lifted into position so that the bracket can be attached back to the threaded stud. The bolt must then be re-attached to the stud member in order to secure the tire into position.

The disadvantages of the present system are obvious and the entire operation represents a safety hazard to the user.

Several solutions to this problem have been presented in the way of wire rope or cable attachments for the spare tire wherein the spare tire may be winched into position or pulled into position by a series of pulleys and levers as taught in the patent to Searcy et al, U.S. Pat. No. 3,390,864, issued in 1968 for a "Handling And Storage Apparatus For A Spare Tire And Wheel Assembly On A Vehicle".

Of particular interest is the Searcy embodiment wherein an elongated lever arm is pivotally attached to the rear bumper of the pickup truck. A first pulley is located under the bed of the pickup truck adjacent the storage position of the spare tire and a second pulley is mounted to the rear bumper of the truck and spaced from the pivot point of the lever arm.

A wire rope or cable then extends from a bracket for holding the spare tire, around the first and second pulleys and is attached to the lever arm whereby the lever arm may be rotated away from the second pulley in order to lift the spare tire into position under the vehicle bed. When the tire is lifted into position, the lever arm is held adjacent the rear bumper of the truck and is locked into position by an eyelet and padlock provided on the bumper of the truck.

A problem with this invention is that should the lock fail or accidentally come open, the tension in the cable will cause the lever arm to swing free thereby releasing the spare tire onto the ground thereby representing a safety hazard.

Further, the spare tire holding bracket taught in the Searcy patent is a rather complicated device having spring-loaded pivotal arms which fit through the center hole in the spare tire wheel while notches in these brackets grip the wheel member. However, should the tire become loose and able to bounce around while beneath the truck, the lever arms could become dislodged thereby causing loss of the spare tire.

SUMMARY OF THE INVENTION

The present invention provides a wire rope spare tire carrier similar to the Searcy et al device, but which overcomes the problems associated therewith. The present invention comprises a first pulley member located directly above the storage position of the tire beneath the bed of a pickup-type truck. A second pulley is positioned on the rear bumper of the truck, the wheel of such second pulley being in communication with the first pulley wheel by a bore or aperture provided through the bumper adjacent the second pulley.

An elongated lever arm is pivotally attached to the bumper of the truck, the pivot point being spaced from the second pulley. A wire rope is attached to the lever arm and extends around both pulleys and terminates beneath the truck with a bracket for holding the spare tire.

The pivot point for the lever arm is positioned rearwardly of the second pulley member so that when the lever arm is rotated away from the second pulley member, the spare tire is lifted into its storage position and since the lever arm attachment point is located rearwardly of the second pulley, the lever arm may be rotated past a breakover point thereby locking the tire into its storage position. It will tend to stay locked into its storage position since the pivot point for the lever arm is rearward of the cable extending from the attachment point of the lever arm to the second pulley. This causes the tension in the cable to help hold the lever in its locked position.

In order to lower the spare tire, a rearward force must be applied to the lever arm moving it past its breakover point whereby the lever arm is then rotated in a direction toward the second pulley which lowers the spare tire onto the ground so that the spare tire may be pulled from beneath the vehicle. Therefore, should the latching mechanism for the lever arm fail or the user forget to lock it into position by way of a padlock, the tension in the cable will cause the lever arm to remain in a locked position.

The present invention also provides a very simple-to-operate, but positive locking bracket member for securing the opposite end of the cable to the spare tire. The bracket member comprises a flat plate member having a width approximately equal to the diameter of the center hole of the spare tire wheel and the length being longer than said diameter. The plate member has a pair of upwardly extending side walls on either side thereof, said side walls having outwardly extending protrusions, the distance between the outward extending protrusions being substantially equal to the diameter of the center hole.

The cable then extends through the plate member and may be either attached to the lower side thereof or may be adjustable by providing three holes in the plate member whereby the effective length of the cable may be adjusted by tying off the cable beneath the plate member.

To attach the bracket to the tire, the plate member is pivoted and inserted longitudinally through the center hole of the wheel until it is passed completely through the wheel. The bracket is then rotated parallel to the plane of the tire and pulled upwardly so that the protrusions snap fit through the hole in the wheel member thereby securing the bracket to the wheel. To remove the bracket from the wheel, the bracket is pressed downwardly to unsnap the protrusions from the wheel member. The bracket is then rotated and pulled endwise out of the center hole.

Hence, the attachment bracket provides a positive attachment to the wheel and even if the cable should become loose, the bracket member is not apt to be inadvertently dislodged. On the other hand, the bracket is easily removed and reinserted into the wheel.

DESCRIPTION OF THE DRAWINGS

Other and further advantageous features of the present invention will hereinafter more fully appear in connection with a detailed description of the drawings in which:

FIG. 2 is a plan view of the carrier of FIG. 1 with the tire in a second position.

FIG. 3 is an end elevational view of the carrier as shown in FIG. 2.

FIG. 7 is a detail perspective view of the spare tire attachment bracket embodying the present invention.

DESCRIPTION OF THE PREFERRED EMBODIMENT

Figure 1:
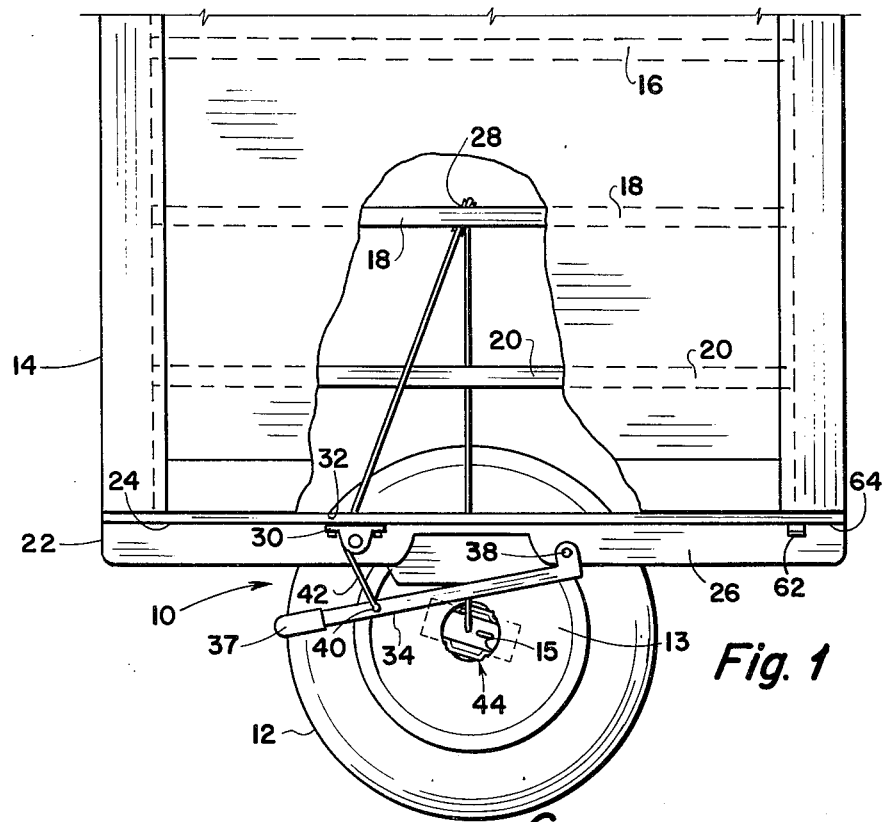
FIG. 1 is a plan view of a spare tire carrier embodying the present invention with the spare tire in a first extended position.

Referring to the drawings in detail, reference character 10 generally indicates a wire rope spare tire carrier suitable for removably carrying a spare tire 12 beneath the undercarriage of a pickup truck 14. It is noted that the invention set forth herein may be suitable for carrying spare tires of large trucks or even automobiles and should not be limited specifically to a pickup truck. The spare tire 12 is typically mounted on a wheel member 13 having a center hole 15 therein.

However, on the other hand, the present problem sought to be overcome is particularly present on the spare tire carriers not utilized on pickup trucks. The standard pickup truck bed is provided with spaced frame cross members 16, 18 and 20, the center cross member 18 being set at a higher elevation than the cross members 16 and 20.

Typically spare tire carriers provided on pickup trucks are designed to support the spare tire in contact with the lower edges of the spaced lower frame members 16 and 20. The truck bed also is typically provided with a rear bumper 20 which comprises a vertical plate member 24 and a rearwardly extending horizontal member 26.

The spare tire carrier 10 comprises a first pulley member 28 secured to the frame member 18. A second pulley member 30 is rigidly mounted to the rear portion of the vertical plate 24 of the bumper 22. Communication is provided between the pulley members 28 and 30 by means of a bore or aperture 32 provided through the plate member 24 of the bumper adjacent the pulley member 30.

An elongated lever arm 34 is provided with an L-shaped ear 36 at one end thereof, said ear being pivotally attached to the horizontal bumper member 26 by way of a pivot pin 38. The pivot pin 38 is spaced laterally from the pulley member 30 and is also spaced rearwardly therefrom on the bumper member for a purpose that will hereinafter be set forth. The opposite end of the lever arm 34 is provided with a suitable handle member 37.

The lever arm 34 may be of tubular construction and is provided with a cable attachment point 40 on the upper surface thereof, the attachment point 40 being spaced from the pivot pin 38 by a distance substantially equal to the spacing between the pivot pin 38 and the pulley 30.

A wire rope or cable member 42 is secured to the attach point 40, is passed through and around the pulley 30, across the pulley 28 and terminates beneath the truck with a bracket member generally indicated by reference character 44.

The bracket member 44 comprises a flat elongated plate member 46 having a width less than the diameter of the center hole 15 of the spare tire wheel 13.

The length of the plate 46 is longer than the diameter of said center hole 15. The bracket 44 further comprises a pair of upwardly extending side walls 48 and 50 along the central portion thereof, said side walls having outwardly extending protrusions 52 and 54, respectively. The distance between the protrusions 52 and 54 is substantially equal to the diameter of the center hole 15 of the wheel 13. The plate member 44 further comprises three spaced bores 56, 58 and 60 therethrough, the bore 56 being centrally located within the plate 46.

Figure 6:
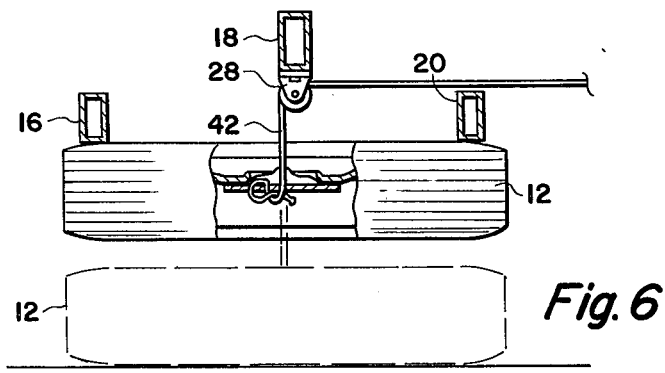
FIG. 6 is a detailed sectional view of the pickup undercarriage taken along the broken lines 6—6 of FIG. 4.

The end of the cable 42 is adjustably attached to the bracket 44 by first passing the end of the cable 42 downwardly through the bore 56, back up through the bore 58 and downwardly through the bore 60. The end of the cable then being passed through the loop created on the underside of the plate 46 between the bores 56 and 58 as shown in FIG. 6.

A latch member 62 is secured to the bumper 22 and is spaced on the opposite side of the lever arm pivot pin 38 from the pulley 30. It is noted that the latch member 62 or the outer end of the vertical plate member 24 of the bumper 22 may serve as a stop member indicated by reference character 64 for a purpose that will be hereinafter set forth.

In operation, to install the bracket 44 to the spare tire 12, the bracket member is pivoted to a substantially vertical position as shown in FIG. 3 and forcibly inserted downwardly through the center hole 15 to the wheel 13. The bracket is then rotated to substantially the plane of the spare tire and an upward force is applied to the cable 42 which causes the protrusions 52 and 54 to snap into the hole 15 thereby securing the bracket to the wheel 13.

The installation of a spare tire would normally be accomplished in the position shown in FIG. 1 wherein the lever arm 34 is rotated in a clockwise direction so that the attachment point 40 is near the pulley 30 thereby providing the longest length of cable 42 beneath the pickup bed.

The user then grasps the handle member 37 of the lever arm 34 and rotates the lever arm in a counterclockwise direction as shown in FIG. 2 which pulls the cable 42 through the pulleys 28 and 30 thereby dragging the tire under the truck to a position directly below the pulley 28.

Figure 4:
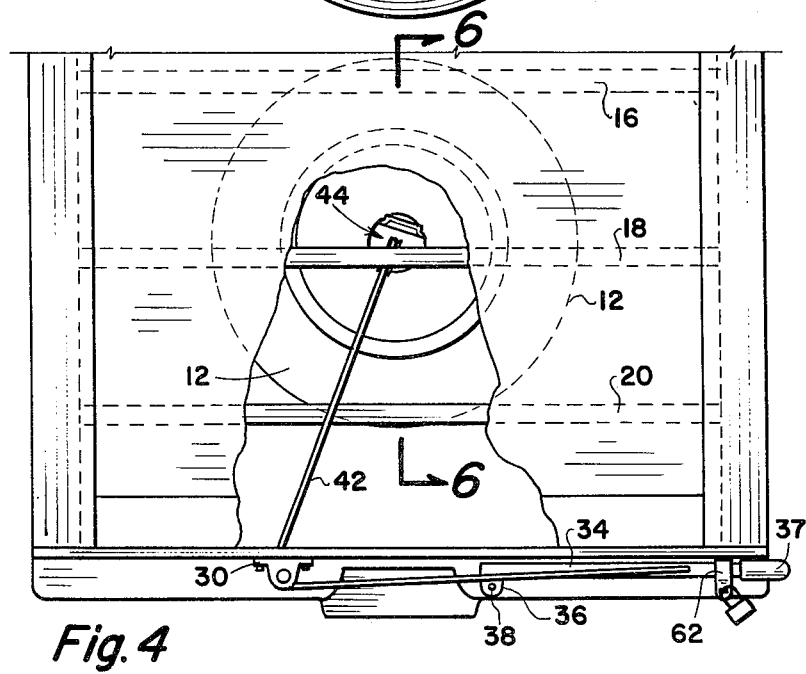
FIG. 4 is a plan view of the carrier with the tire in a third secured position.
Figure 5:
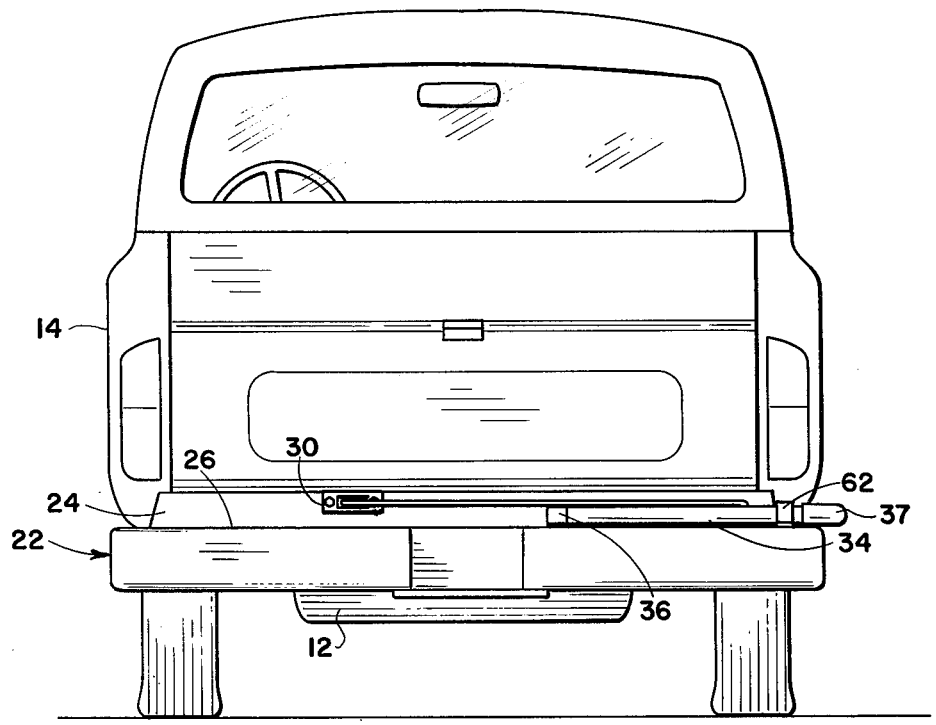
FIG. 5 is an end elevational view of a vehicle wherein the spare tire carrier is in its secured position.

Continued rotation of the lever arm 34 in a clockwise direction as shown in FIG. 4, causes the tire to be pulled upwardly until the rubber portion thereof contacts the frame cross members 16 and 20 as shown in FIGS. 4 and 6. It can be seen that when the pulley member 30, pivot pin 38 of the lever arm, and the attachment point 40 of the lever arm are in alignment, the spare tire will be tightly against the lower surface of the frame members 16 and 20. However, a further clockwise force is applied to the lever arm 34 so that the cable member 42 passes over the lever arm pivot pin 38 into a locked position as shown in FIG. 4.

It is noted that when the lever arm is in the position as shown in FIG. 4, the cable extending from the attachment point 40 to the pulley 30 is forward of the lever arm pivot pin 38 thereby applying a counter-clockwise force to the lever arm 34 to tend to hold it in a closed position. The latch member 62 may then be closed and a suitable padlock or other security member may be attached to prevent theft of the spare tire. However, since in the closed position there is a constant force tending to hold the lever arm in the locked position, there is little danger of the spare tire coming loose because of inadvertent rotation of the lever arm.

In order to remove the spare tire, the latch member 62 is loosened and the lever arm is rotated in a clockwise direction which lowers the spare tire to the ground in a position as shown in FIG. 2. The user may then reach under the vehicle and pull the spare tire rearwardly to the position shown in FIG. 1 which will cause the lever arm to further rotate in a clockwise direction.

Since to dislodge the lever arm from its locked position as shown in FIG. 4 takes some force to overcome the tension in the cable to achieve the breakover, the length of the lever arm 34 is such that the handle member 37 extends some two inches outwardly from the bumper so that one may easily grasp the handle member in order to loosen the spare tire.

From the foregoing it is apparent that the present invention provides a wire rope spare tire carrier having a safety feature of being positively held in a locked position and also provides a bracket member which is simple in construction and effective in supporting the tire in its locked position.

Whereas the present invention has been described in particular relation to the drawings attached hereto, other and further modifications apart from those shown or suggested herein may be made within the spirit and scope of the invention.

What is claimed is:

1. A vehicle spare tire carrier comprising
   a first pulley securable to the vehicle adjacent the storage position of the tire;
   a second pulley securable to the vehicle and spaced from the first pulley;
   an elongated lever arm having one end pivotally secured to the vehicle, the pivot point thereof being spaced from the second pulley and having axis of rotation parallel to the axis of rotation of the second pulley, a cable attachment point on the lever arm spaced from the pivot point, wherein the second pulley is located at a higher level than the lever arm pivot point, the cable attachment point being on the upper side of the lever arm whereby said cable member may be rotated fully past the lever arm pivot point;
   a flexible cable extending from the attachment point on the lever arm, around both pulleys and terminating with a spare tire carrier bracket, the length of the cable being such that when the lever arm is fully pivoted in a first direction, the spare tire may be removed from the vehicle and when the lever arm is pivoted in a second direction the spare tire is pulled into tight engagement with the vehicle;
   a stop member carried by the vehicle to prevent rotation of the lever arm beyond a locked position in the second direction, the relative positions of the second pulley, the lever arm pivot point and the stop member being such that when the lever arm is in the locked position, the cable extending from the cable attachment point to the second pulley is offset from the lever arm pivot point whereby tension in the cable tends to keep the lever in its locked position against the stop member;
   wherein the first pulley is positioned under the bed of the pickup truck and the second pulley is carried by the mid-portion of the bumper of the vehicle, the outer end of the bumper serving as the stop member, the lever arm pivot point being spaced rearwardly of a line connecting the stop member and the second pulley.

2. A vehicle spare tire carrier as set forth in claim 1 and including a latch member carried by the outer end of the bumper and engagable with the lever arm in its locked position, and wherein the outer end of the lever arm is provided with a handle member, said handle member extending outwardly from the vehicle bumper in the locked position.

3. A vehicle spare tire carrier as set forth in claim 1 wherein the spare tire carrier bracket is engagable with the center hole of the vehicle wheel, the bracket comprising a plate member having a pair of oppositely disposed side walls in the central edge portion, outwardly extending protrusions on each of the side walls, the distance between the protrusions being substantially equal to the diameter of the center hole of the vehicle wheel whereby said bracket may be passed through said center hole of the wheel in a first endwise position and wherein the protrusions snap fit into the center hole of the wheel in a second cross-wise position.

4. A vehicle spare tire carrier as set forth in claim 3 and including means carried by the bracket for adjusting the effective length of the cable.

5. A vehicle spare tire carrier as set forth in claim 4 wherein the means for adjusting the effective cable length comprises three spaced holes in the bracket member whereby the cable is passed through the first hole and back through the second hole forming a loop therebetween, said cable then being passed through the third hole and back through said loop for positively locking said cable in place.

* * * * *